INVENTORS.
PHILIP B. CLARK
HAROLD A. VAN DUSEN JR.
BY
Joseph A. Lemignani
Attorney INVENTORS.
PHILIP B. CLARK
HAROLD A. VAN DUSEN JR.
BY
Joseph A. Gemignani
Attorney

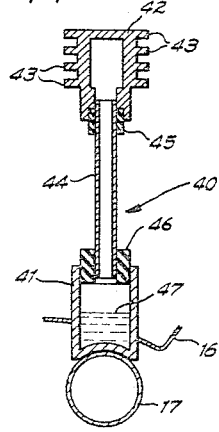
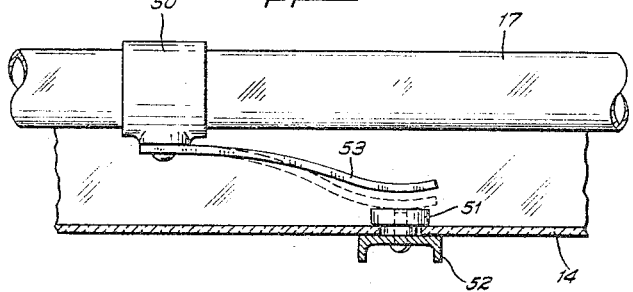
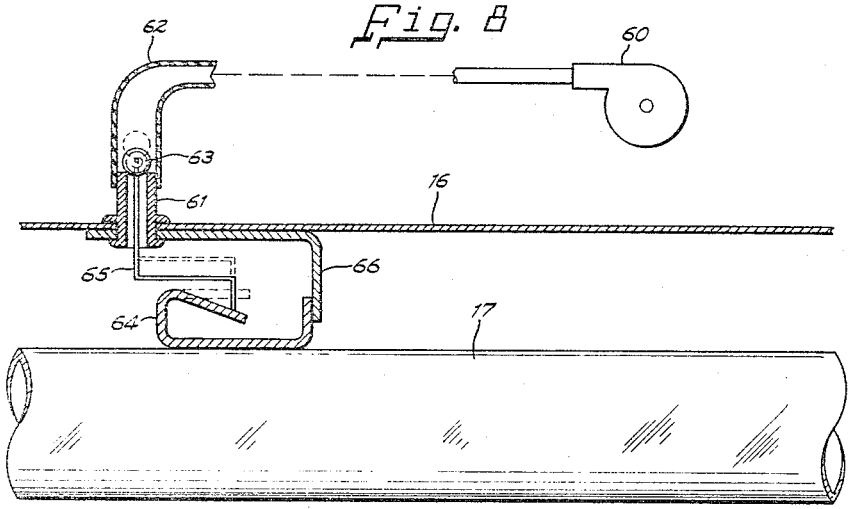
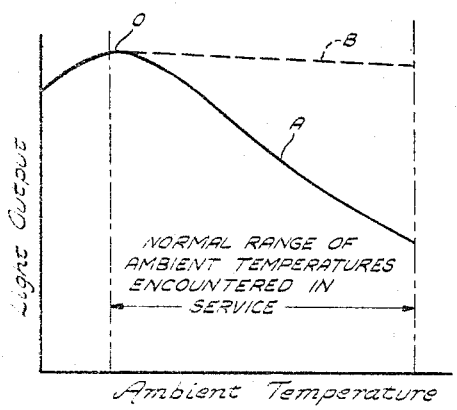

United States Patent Office 3,309,565
Patented Mar. 14, 1967

3,309,565
LIGHT OUTPUT OF FLUORESCENT LAMPS AUTOMATICALLY HELD CONSTANT BY MEANS OF PELTIER TYPE COOLERS
Philip B. Clark, Hales Corners, and Harold A. Van Dusen, Jr., South Milwaukee, Wis., assignors to McGraw-Edison Company, Milwaukee, Wis., a corporation of Delaware
Filed Dec. 14, 1959, Ser. No. 859,455
14 Claims. (Cl. 315—117)

This invention relates to fluorescent lamps, and more particularly relates to a fluorescent-type luminaire for use in outdoor street lighting systems wherein the luminaires are exposed to and expected to operate efficiently over a wide range of ambient temperatures.

The light output of a fluorescent lamp varies to a marked degree with variations in temperature. The light output of the fluorescent lamp is dependent upon the power input to the lamp and the amount of ultra-violet light of proper wave length emitted by the mercury vapor, contained in the lamp, to excite the phosphors of the fluorescent lamp. Both the power input to the lamp and the amount of ultra-violet light emitted are determined by the pressure of the mercury vapor. An optimum amount of proper ultra-violet light will be emitted and the power input will be near optimum when the mercury vapor is at a certain critical pressure. The pressure of the mercury vapor within the fluorescent lamp bulb is dependent upon the temperature of the fluorescent lamp bulb, which in turn is dependent upon the temperature ambient the fluorescent lamp and the luminaire.

When the fluorescent lamp is initially energized its lamp bulb temperature increases and accordingly the mercury vapor pressure within the lamp bulb increases. The increase in mercury vapor pressure continues, as the temperature of the lamp bulb rises, until the mercury vapor attains the above-mentioned critical pressure. At that pressure the power input to the lamp is near optimum and an optimum amount of ultra-violet light is being emitted from the mercury vapor so that the fluorescent lamp is producing optimum light output. In operation, the temperature of the fluorescent lamp bulb will continue to increase above the temperature which produces the critical mercury vapor pressure and increase the pressure of the mercury vapor beyond the critical pressure. As the mercury vapor pressure increases above this critical pressure point, it has been observed that, instead of the light output of the fluorescent lamp increasing accordingly, the light output reaches an optimum at the critical pressure and above that pressure the light output falls off markedly.

In the past, in an attempt to provide more efficiently operating fluorescent lamps, it has been the practice to design the fluorescent lamps such that the critical pressure of mercury vapor will occur at a predetermined ambient temperature and will accordingly produce maximum light output at that temperature. The chosen predetermined ambient temperature was that temperature in which the fluorescent lamps would normally be operating. In view of the above discussion, it can be seen that a shortcoming of these lamps was that although they would produce maximum light output at the predetermined temperature, namely the ambient temperature in which the lamp normally operated, should the ambient temperature rise above that predetermined temperature the light output of the fluorescent lamp would fall off. In some cases, where the variations in ambient temperature from the normal are great, the decrease in light output is considerable and the light output of the lamp is far below optimum.

Other attempts have also been made to provide a fluorescent lamp which would provide a consistent light output at or near the optimum value. For example, one such attempt consisted of increasing the area of a portion of the lamp so that heat would be more readily dissipated. This, among other attempts, was unsuccessful in providing a fluorescent lamp which would produce optimum light output over a wide range of ambient temperatures. It succeeded only in elevating the ambient temperature in which the fluorescent lamps could be operated and still produce an optimum light output. That is, the ambient temperature in which the fluorescent lamps would produce optimum light output was merely shifted and where elevated temperatures were encountered the light output of the fluorescent lamp would still experience a marked decrease.

The pressure of the mercury vapor within the fluorescent lamp bulb is determined by the coolest spot on the bulb wall. When the mercury vapor contacts this cool spot on the bulb wall, a portion thereof will condense and cause a corresponding reduction in the mercury vapor pressure within the lamp bulb. We have discovered that by maintaining a spot on the lamp bulb at that temperature at which the critical mercury vapor pressure occurs, and at which optimum light output occurs, it is possible to produce optimum light output over a wide range of ambient temperatures and corresponding lamp bulb temperatures.

By controlling the temperature of a minute spot or localized portion of the lamp bulb wall we are able to control the mercury vapor pressure within the lamp bulb and correspondingly control the light output of the fluorescent lamp. The result is, a fluorescent lamp in which the light output will remain constant over a wide range of ambient temperatures. Therefore, we provide a fluorescent lamp the light output of which is determined not by the temperature of the ambient air, which in turn determines the lamp bulb temperature, but by the temperature of a controlled minute spot or localized portion of the lamp bulb.

Basically, we provide means for cooling and maintaining a portion of the fluorescent lamp bulb at a predetermined temperature. This means includes means for sensing and temperature of a minute spot or localized portion of the fluorescent lamp, means for conducting heat from that portion and dissipating the heat so conducted to the ambient atmosphere, and means for varying the amount of heat conduction in accordance with the temperature of the localized portion so as to maintain the mercury vapor pressure within the lamp at critical pressure.

Accordingly, it is an object of our invention to provide a fluorescent lamp which will produce optimum light output over a wide range of ambient temperature.

Still another object of our invention is to provide a fluorescent lamp the light output of which is determined by the temperature of a minute spot or localized portion of the fluorescent lamp bulb wall.

It is another object of our invention to provide compact apparatus for controlling the temperature of a localized portion of a fluorescent lamp.

A still further object of our invention is to provide means for cooling and controlling the temperature of a portion of a fluorescent lamp bulb which is readily incorporated into present luminaries without extensive modifications.

These and additional objects and advantages of our invention will be apparent from a reading of the following detailed description in connection with the drawing in which:

FIG. 6 is a partial cross-sectional view of an alternative embodiment of our invention.

FIG. 7 is a partial cross-sectional view of still another alternative embodiment of our invention.

FIG. 8 is a semi-diagrammatical view of another embodiment of our invention.

FIG. 9 illustrates curves plotting light output against ambient temperature for a luminaire incorporating our invention and a luminaire without our invention.

Figure 1:
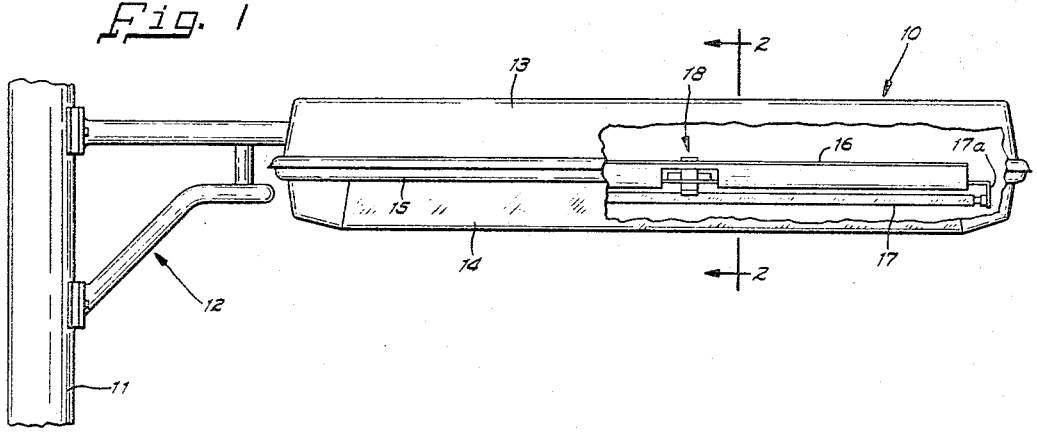
FIG. 1 is a side view of a typical fluorescent luminaire mounted in operating position and incorporating our invention.
Figure 2:
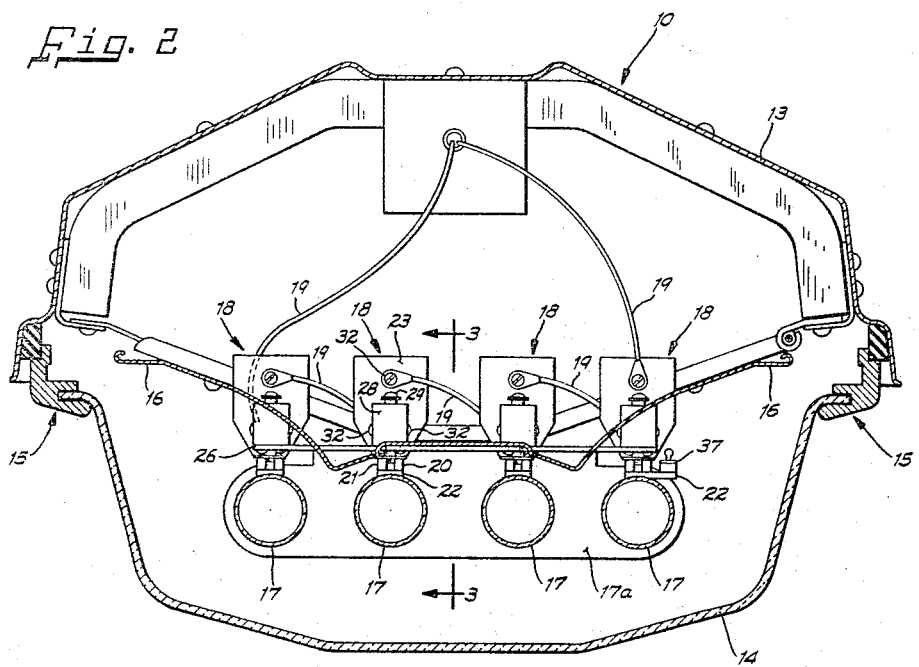
FIG. 2 is a cross-sectional view taken along lines 2—2 of FIG. 1.

FIGS. 1 and 2 illustrate a luminaire 10 of the type in which our invention may be incorporated. Only those elements of the luminaire 10 necessary for a thorough understanding of our invention have been illlustrated and will be described. The specific details of the luminaire are shown and described in a co-pending patent application of Donald W. Harling and Philip B. Clark, entitled Fluorescent Luminaire, Ser. No. 685,438, which was filed on Sept. 23, 1957, now Patent No. 3,092,336, and is assigned to the assignee of this application. The specific details of the luminaire 10 will neither be illustrated nor discussed in this application and reliance is placed on the above identified co-pending application for a disclosure of such specific details.

Referring to FIG. 1, the luminaire 10 is illustrated in its normal operating position, that is, fixed to a suitable vertically extending member 11 by connecting means 12 so that the elongated luminaire 10 will extend in a substantially horizontal direction.

The luminaire 10 consists of a metal hood 13, a plastic cover 14 attached to the metal hood 13 by suitable connecting means 15 and has a reflector portion 16 suitably mounted and disposed therein. Also contained in the luminaire 10 are a plurality of fluorescent lamps 17 which are attached to suitable socket means 17a and disposed below the reflector portion 16. Four fluorescent lamps 17 have been illustrated in FIG. 2 as this is the usual number of lamps used in a fluorescent luminaire. However, it should be noted that our invention may be used in combination with any number of fluorescent lamps and it is not intended that it be limited to the particular number shown.

One embodiment of our invention is illustrated in FIGS. 1–5. This embodiment utilizes the principles of thermoelectricity to cool a spot or localized portion on the lamps 17. Specifically, a plurality of Peltier-type junctions are provided to transfer heat away from a localized portion of the lamps 17. It is well known that when a direct current is passed through a Peltier-type junction, that is a junction of two dissimilar metals, that one end of the junction will become cooler and the other will become warmer. The cooling means incorporating the Peltier elements is designated 18 and is disposed above and contacts a localized portion of each of the fluorescent lamps 17. The cooling means 18 are each connected in a series circuit arrangement with a direct current source by leads 19 (as will more clearly be discussed hereinafter). The direct current source may take any suitable form, but preferably is a combination A.C. to D.C. rectifier and a step down transformer. The step down transformer supplies low voltage current of a proper value for safe operation of the cooling means 18 and the rectifier converts A.C. current to D.C. current.

Figure 3:
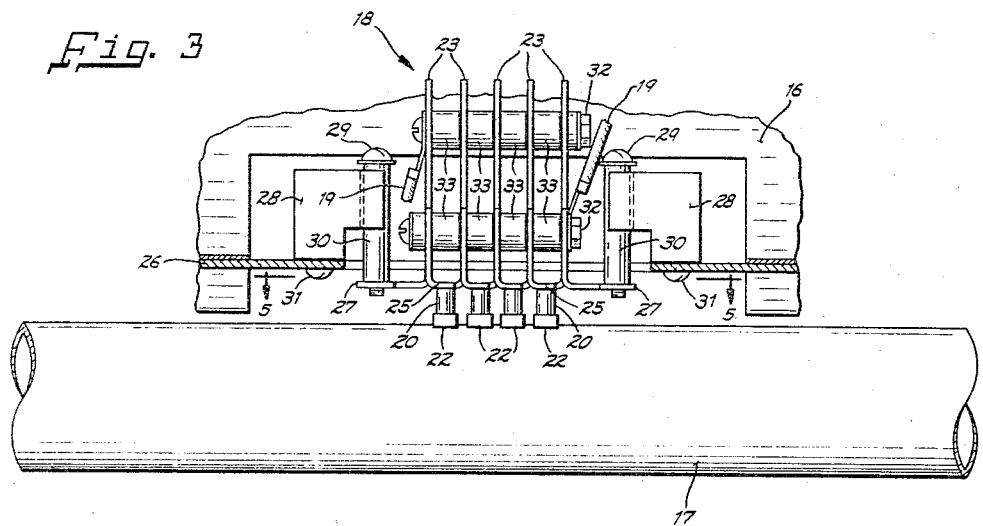
FIG. 3 is a partial cross-sectional view taken along lines 3—3 of FIG. 2.
Figure 5:
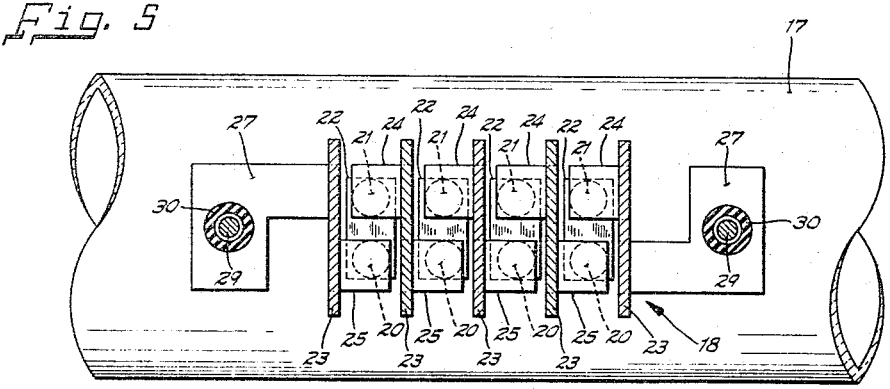
FIG. 5 is a partial cross-sectional view taken along lines 5—5 of FIG. 3.

The structure of cooling means 18 is shown most clearly in FIGS. 3 and 5. Any suitable number of Peltier junctions may be used and the present embodiment incorporates eight such junctions, four of the junctions being N-type junctions 20 and the other four being P-type junctions 21.

Disposed adjacent a localized portion of each of the lamps 17 is heat absorbing means 22 which can be made from any electrical and heat conducting metal but preferably takes the form of a copper shoe. The heat absorbing means 22 are maintained at a temperature equal to or below the temperature at which optimum light output will occur (as will be discussed more fully hereinafter). Because of the differential in temperature between the portion of lamp 17 and the heat absorbing means 22 they are associated in a heat transfer relationship and the heat absorbing means 22 receives heat from that portion of the lamps 17.

Spaced from the heat absorbing means 22 are a plurality of heat dissipating members 23. Respective ones of the heat dissipating members 23 and heat absorbing means 22 are connected in heat transfer relation by the Peltier elements 20 and 21. The heat absorbing means 22 and heat dissipating members 23 cooperate to electrically connect the Peltier elements 20 and 21 to the D.C. source. Preferably the Peltier elements 20 and 21 are connected in a series circuit arrangement with the D.C. source. As is probably most clearly illustrated in FIG. 5, this series circuit connection is accomplished by electrically and mechanically connecting a pair of Peltier elements 20 and 21, preferably by soldering or brazing, to each of the heat absorbing means 22. The heat dissipating members 23 are each provided with a pair of leg portions 24 and 25 which are disposed at and extend laterally from opposite sides of the bottom portion of the members 23. The leg portion 24 engages a Peltier element 21 attached to one heat absorbing means 22 and the leg portion 25 engages a Peltier element 20 attached to an adjacent heat absorbing means 22. The heat absorbing and dissipating members 23 are then so disposed between and connected to the Peltier elements 20 and 21 as to cooperate with heat absorbing masses 22 in connecting the Peltier elements in series circuit arrangement.

Tracing this series circuit, direct current enters through the lead 19 on the left side of the assembly shown in FIG. 3, passes through the first heat dissipating member 23 to its leg portion 25, through one of the Peltier elements 20, through the heat absorbing means 22, through the second Peltier element 21 to the leg portion 24 of the adjacent heat dissipating member 23, onto the leg member 25 of this heat absorbing and dissipating member 23, and so on to the lead 19 on the right hand side of the cooling means 18 where it then passes to the next cooling means 18.

The Peltier elements 20 being N-type elements and the Peltier elements 21 being P-type elements, and since an N-type Peltier element will transfer heat in a direction opposite to that of the current flow and a P-type Peltier element will transfer heat in the direction of the current flow, it can be seen that as current passes through means 18, as described above, the heat absorbing means 22 will become a cold junction and the heat absorbing and dissipating members 23 will become a hot junction. Heat from the portion of lamp 17 will then be received by the heat absorbing means 22 because of the differential in temperature therebetween. The Peltier elements transfer heat from the heat absorbing means 22 to the heat dissipating members 23 where it is dissipated. Actual dissipation of the heat may take place in any one of a number of suitable ways, such as exposing the heat dissipating members 23 directly to the ambient atmosphere or subjecting them to the stream of air produced by a fan (not shown) usually provided to cool the ballasts (not shown) normally contained in the luminaire.

Any suitable means may be employed to control the amount of heat transfer between the members 22 and 23, however it is preferable to use a thermostat 37 as shown in FIG. 2. The thermostat 34 is thermally connected to one of the heat absorbing means 22 and hence is exposed to and influenced by the heat thereof, which in turn is dependent on the heat of the portion of lamp 17 adjacent to the heat absorbing means 22. The thermostat 34 is electrically connected to the D.C. source and is operative to control the D.C. current supplied to the Peltier junctions in accordance with the temperature of the portion of the lamp 17. The use of only one thermostat unit 37 is preferable as it results in compactness and has proved to give satisfactory results.

To mount the cooling means 18 within the luminaire, a horizontally extending plate 26 is provided which is fixedly mounted on the reflector 16. The heat dissipating members 23 disposed at opposite ends of the electronic cooling means 18 are provided with laterally extending L-shaped leg portions 27 which are attached to a mounting bracket 28 by suitable screw means 29 and spacer means 30. Mounting bracket 28 is in turn fixedly mounted to the horizontally extending plate 26 by suitable screw means 31. Spacer means 30 is preferably of an insulating material so that cooling means 18 is electrically insulated from the reflector 16. Cooling means 18 are then disposed in and extend through an aperture 32 in plate 26 and contact the lamps 17.

Figure 4:
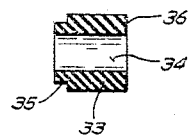
FIG. 4 is an enlarged cross-sectional view of an insulating spacer used in the apparatus of FIG. 3.

The heat absorbing and dissipating members 23 are connected by suitable screw and nut means 32 which carry spacers 33. The spacers 33 are each disposed between adjacent heat absorbing and dissipating members 23. Spacers 33 are of electrical insulating material, preferably ceramic and are so configured as to mate each with the other to insulate the members 23 one from the other and from the screw and nut means 33. More specifically as illustrated in FIG. 4 the spacer 33 has an axially extending bore 34 and a portion 35 of reduced diameter which forms a shoulder on one end of spacer 33. In the assembly 18, the portion 35 is disposed within a suitable aperture in members 23 and the next adjacent member 23 abuts the end 36 of the spacer 33 and is also provided with an identical spacer 33 the portion 35 of which abuts the end 36 of the preceding spacer and fits into an aperture in said adjacent member 23. The members 23 are then relatively spaced and electrically insulated one from the other and from the connecting screw 32.

An alternative embodiment of my invention is illustrated in FIG. 6. For simplicity only a portion of the luminaire assembly is shown, namely one fluorescent lamp 17 and one vapor cooling unit 40 for cooling and controlling the temperature of a localized portion of the bulb of lamp 17. However, it should be noted that in this embodiment a unit 40 is used for each lamp 17 included in the luminaire assembly.

The unit 40 is disposed in and extends through an aperture in the reflector 16 and rests on the bulb wall of the lamp 17. Immediately adjacent the lamp 17 is a boiler chamber 41 and spaced vertically from the boiler chamber 41 is a condenser chamber 42 having a plurality of cooling fin portions 43 extending peripherally around the chamber 42. Connecting the boiler chamber 41 and the condenser chamber 42 is a vapor passage means consisting of an elongated tubular member 44. The junctures between the tubular member 44 and the boiler member 41 and the condenser member 42 are made through bushings 45 and 46 respectively.

A liquid 47 is contained in the boiler member 41 which receives heat from the portion of the lamp 17 adjacent the boiler chamber 41. Any suitable liquid may be used within the boiler chamber 41, the determining factor being the temperature at which the portion of the lamp bulb 17 is to be maintained. The liquid 47 is selected so as to have a boiling point which corresponds to the temperature at which the portion of the lamp bulb 17 is to be maintained. A suitable liquid for some applications has been isopropylchloride, however, any liquid may be used dependent upon what temperature to be maintained.

The condenser member 42 is designed to have sufficient external surface area to dissipate a predetermined number of watts of heat energy for a given temperature rise, over a predetermined ambient temperature, of the localized portion of lamp 17 adjacent the boiler chamber 41.

The connecting tube 44 is preferably as small in diameter as practicable, to have sufficient flexibility for ease of insulation and limited heat absorption characteristics so as to absorb a limited amount of heat from the internal luminaire air. The joints between the bushings 45 and 46 and the elongated connecting member 44 should be sealed to insure a pressure tight system. This seal may be made in any suitable manner, however, it has been found that the most efficient seal is accomplished by either a solder or a brazed joint since other sealants may be detrimentally affected by the vapor produced by the liquid contained in the boiler chamber.

In operation, after the lamps 17 have been energized, heat from the portion of the lamp 17 adjacent the boiler member 41 is transferred to the liquid 47. The liquid 47 is heated and will boil at a predetermined temperature. As the liquid 47 boils a vapor is generated which is transferred to the condenser chamber 42 by means of the vapor passage member 44. Upon reaching the condenser 42 the vapor contacts the relatively cool walls thereof and is condensed and flows back through the connecting member 44 to the boiler 41.

The cooling fin portions 43 of the condenser 42 dissipate the heat absorbed by the condenser 42 to the ambient atmosphere. Cooling fins 43 may be disposed directly in the ambient atmosphere or, as was discussed in relation to the cooling means 18, be placed in the stream of air circulated within the ballast chamber of the luminaire housing 10. By so exposing the condenser 42, the temperature thereof can be maintained below that which corresponds to the boiling point of the liquid 47 and it will therefore recondense the vapor which comes in contact therewith.

A further advantage of this embodiment is that no independent control means, such as the thermostat 34 which was used in conjunction with the cooling means 18, is required. The vapor cooling means 40 is self-exciting and self-controlling in that only a temperature corresponding to or above the boiling point of the liquid 47 will effectuate operation of cooling means 40 and any lesser temperatures will have no effect thereon.

Vapor cooling means 40 will control and maintain a portion of the lamp 17 at a predetermined temperature. The liquid 47 has a boiling point equal to the temperature at which the localized portion of the lamp is to be maintained. The liquid being cooler than that portion is in heat transfer relation therewith and will receive heat therefrom. The heat absorbed by the liquid 47 is transfered from that liquid in the form of a vapor which is generated by the boiling liquid. The connecting member 44, in providing a passage for the vapor from the boiler 41 to the condenser 42 where the heat contained in the vapor is transfererd to the condenser walls connects the liquid 47 and condenser 42 in heat transfer relationship. The condensed vapor returns to the boiler as a liquid and the heat absorbed by the condenser 42 is dissipated to the ambient atmosphere. The boiling liquid remains at a constant temperature and, due to the boiling action, maintains the heat transfer relation between it and the portion of the lamps 17.

A further embodiment of our invention is illustrated in FIG 7. The fluorescent lamp 17 is provided with a metallic spring clinp member 50 which surrounds and is in engagement with a localized portion of the lamp 17. Disposed on the inner surface of the glass refractor 14 is a heat sink member 51 that is connected to a heat dissipating member 52 disposed on the exterior of the glass refractor 14 and exposed to the atmosphere ambient the luminaire. A bi-metal element 53 is attached at one end to the spring clip 50 and is operative to assume a cold or unflexed position, indicated by the full lines, and a hot or flexed position indicated by the dotted lies.

The spring clip 50 absorbs heat from the portion of the lamp 17 and conducts the heat to the bi-metal element 53. The bi-metal element 53 under the influence of the heat will flex and its free end will engage the heat sink member 51 to establish a heat transfer connection between the spring clip 50 and the heat sink 51.

The bi-metal element 53 is selected with the proper characteristics so that it will flex when the portion of the lamp 17 exceeds the predetemined temperature at which the portion is to be controlled. That is, when the temperature of the portion of the lamp adjacent the spring clip 50 is below optimum operating temperature the bi-metal element 53 will assume the full line position and the spring clip 50 and the heat sink 51 will be thermally isolated. However, when the temperature of the lamp bulb 17 adjacent the spring clip 50 exceeds the optimum operating temperature the bi-metal element 53 will flex to the dotted position thereby connecting the spring clip 50 and the heat sink 51 in heat transfer relation and conduct heat away from the spring clip 50, and correspondingly away from the lamp bulb 17 to maintain the portion of the lamp 17 at a predetermined temperature. The heat is transferred from the heat sink 51 to the heat dissipating member 52 where it is dissipated to the ambient atmosphere.

As in the vapor cooling system illustrated in FIG. 5, this embodiment also requires no independent control means. The bi-metal element 53 acts as the sensing and control means.

The bi-metal element 53 connects the clip 50 and heat sink 51 in heat transfer relation and transfers heat from the clip 50 to the heat sink 51 when the temperature of the former exceeds the temperature at which the portion is to be controlled. In this way, whenever the temperature of the portion of lamp 17 exceeds the predetermined temperature, a temperature differential is maintained between the clip 50 and that portion by conducting heat away form the clip 50 to the heat sink 51 where it is dissipated to the ambient atmosphere by heat dissipating means 52.

It is also possible to carry out our invention by directing, upon a localized portion of the lamp bulb wall, a stream of air at a lower temperature than that at which the portion of the lamp 17 is to be controlled. FIG. 8 illustrates one of many apparatus for accomplishing this end. An air blower 60, which is operative to draw air from outside the luminaire or from any sufficiently cool source into the luminaire 10, is connected to a nozzle member 61 by suitable connecting means 62. The nozzle member 61 engages and is fixed to the reflector member 16 as shown. A ball valve 63 is provided in the nozzle 61 and is disposed in the air stream from the blower 60. The ball valve 63 is connected to a bi-metal element 64 by an elongated Z-shaped member 65 one end of which is attached to the ball valve 63 and the opposite end thereof rests upon the bi-metal element 64. The bi-metal element 64 is disposed adjacent a portion of the fluorescent lamp 17 and is mounted to the reflector portion by L-shaped bracket means 66.

The full line drawing of the ball valve 63 and the bi-metal element 64 indicates the cold position and the dotted line indicates the hot position. The bi-metal element 64, being disposed adjacent the lamp bulb 17, receives heat therefrom and when the heat of the lamp adjacent the bi-metal element exceeds the optimum operating temperature the bi-metal element flexes to the dotted position thereby raising the ball valve to the dotted or hot position and opens the nozzle 61. A stream of air then flows through the nozzle 61 and past a portion of lamp 17 to receive heat therefrom and carry the heat away to the ambient atmosphere.

The air from the blower 60, as was discussed above, is at a temperature lower than the temperature at which the portion of the lamp 17 is to be maintained. A heat transfer relation then exists between that air and the lamp 17 when the portion to be controlled exceeds a predetermined value. The air provides means for absorbing heat from the portion. The air blower provides a continuous supply of relatively cool air to maintain the heat transfer relation and the bi-metal element controls the air supply in accordance with the temperature of the portion of lamp 17 to be controlled.

As in the vapor cooling system and the spring clip cooling system, the embodiment of FIG. 7 requires no independent control means. The bi-metal element 64 acts both as the sensing and control means and, through the ball valve 63, varies the amount of cool air which is transmitted to the lamp 17.

In operation then, we energize the fluorescent lamps of a luminaire; sense the temperature of a portion of the lamp bulb of the fluorescent lamp; and, when the temperature of that portion exceeds a predetermined optimum operating temperature, cooling means is actuated which takes heat from a localized portion of the fluorescent lamp bulb and conducts and dissipates that heat away from the fluorescent lamp. More specifically, to accomplish this we dispose heat absorbing means, at the predetermined temperature, adjacent a localized portion of the lamp bulb so that the heat absorbing means will receive heat from that portion, and we provide means for transferring heat away from the heat absorbing means so that a heat transfer relation between the localized portion of the lamp and the heat absorbing means is maintained. In this way, the temperature of a localized portion of the fluorescent lamp bulb may be maintained to thereby control the light output of the fluorescent lamp over a wide range of temperatures ambient the luminaires. This is true because, with our cooling means, the light output of the fluorescent lamps of the luminaires is not dependent upon ambient temperatures, which are known to vary over a wide range, but are dependent upon the temperature of a minute spot or localized portion of the fluorescent lamp which is controlled by our cooling means and maintained at an optimum operating temperature.

We have discovered that, by operating a four-lamp fluorescent luminaire in accordance with our invention, the lighting characteristics thereof show a marked improvement over those available from prior art apparatus. More specifically, we have found that by operating a luminaire in an ambient temperature of 77° F. and in accordance with our invention that a light output 72% higher than that available from a similar luminaire without a cooling device can be obtained. Further, it was observed that the light output of such a luminaire, that is cooled in accordance with our invention, would remain constant through an ambient temperature range of from below 0° F. to substantially over 77° F.

The minute spot or localized portion of the lamp bulb wall can be as small as approximately 0.15% of the entire bulb wall to give satisfactory results. The cooling capacity required to maintain the temperature of the minute spot is much less than that which would be required to cool the entire lamp bulb wall to a predetermined temperature. Furthermore, the remainder of the lamp bulb wall may be at a temperature which is considerably higher than that of the controlled minute spot and still provide satisfactory results.

Referring to FIG. 9, wherein two curves A and B plotting light output against ambient temperature are illustrated, curve A represents the characteristics of a fluorescent-type luminaire, such as that illustrated in FIGURES 1 and 2, without our cooling means. As can be seen after the fluorescent lamps are energized the light output will increase to an optimum at point O. When the ambient temperature exceeds this temperature, the light output falls off markedly. Now referring to curve B, which represents the characteristics of a fluorescent-type luminaire which incorporates our cooling means, it can be seen that up to the point O, that is at very low ambient temperature, the light output increases the same as though no cooling means were included. But after reaching the temperature corresponding to point O and upon subjection to increased ambient temperatures the light output of this luminaire does not fall off and remains constant over a wide range of temperatures. The falling off of this curve occurs at ambient temperatures rarely, if ever, encountered in service.

Although we have discussed our invention with respect to specific embodiments thereof it has been with full realization that additional embodiments and modifications will readily become apparent to those skilled in the art, therefore, it is not intended that our invention be limited to the disclosed embodiments. Accordingly, it is our intention to encompass in the appended claims all embodiments and modifications which fall within the true spirit and scope of our invention.

What we claim is:

1. In combination with a fluorescent lamp, the light output of which is optimum at a predetermined lamp bulb temperature and diminishes at temperatures above said predetermined temperature, means for cooling and maintaining a localized portion of said lamp bulb at said predetermined temperature, said means including at least one Peltier-type junction positioned adjacent said localized portion, and means for passing an electric current through said Peltier-type junction so that heat is conducted away from said localized portion, said localized portion being maintained at said predetermined temperature so that the light output of said lamp is maintained at optimum.

2. In combination with a fluorescent lamp the light output of which is optimum at a predetermined lamp bulb temperature and diminishes at temperatures above said predetermined temperature, means adjacent a localized portion of said lamp bulb for absorbing heat from said localized portion, means spaced from said heat absorbing means for dissipating heat, at least one Peltier-type junction connecting said heat absorbing means and said heat dissipating means, means for passing an electric current through said Peltier type junction so that heat is transferred from said heat absorbing means to said heat dissipating means, and means controlled by the temperature of said localized portion for controlling the passage of current through said Peltier-type junction to control the rate of said heat transfer so that said localized portion is maintained at said predetermined temperature and the light output of said fluorescent lamp is maintained at optimum.

3. In a luminaire having at least one fluorescent lamp the light output of which is optimum at a predetermined lamp bulb temperature and which diminishes at temperatures above said predetermined temperature, the combinations with said lamp of means adjacent a localized portion of said lamp for cooling and maintaining said localized portion at said predetermined temperature; said means comprising a plurality of relatively spaced heat absorbing shoes adjacent a localized portion of said lamp and receiving heat therefrom, a heat dissipating member spaced from each of said heat absorbing shoes, a pair of Peltier-type junctions connecting respective ones of said heat absorbing shoes and heat dissipating members, a source of electrical energy, said Peltier-type junctions, heat absorbing means, heat dissipating members and said source of electrical energy being so interconnected that when an electric current is passed through said Peltier-type junctions heat is transferred from said heat absorbing shoes to said heat dissipating members, and means controlled by the temperature of said localized portion and connected to said source of electrical energy for controlling the amount of said heat transfer in accordance with the temperature of said localized portion, so that said localized portion is maintained at said predetermined temperature and the light output of said lamp is maintained at optimum.

4. In a luminaire having a plurality of fluorescent lamps the light output of each of which is a maximum at a predetermined lamp bulb temperature and which diminishes at temperatures above said predetermined temperature, the combination with each of said lamps of a plurality of relatively spaced heat absorbing shoes disposed adjacent a localized portion of each of said lamp bulbs and receiving heat therefrom, a heat dissipating member spaced from each of said heat absorbing shoes, a pair of Peltier-type junctions connecting respective ones of said heat absorbing shoes and said heat dissipating members, a source of electrical energy, said heat absorbing shoes and said heat dissipating members cooperating to connect said Peltier-type junctions in series circuit relationship with each other and said source of electrical energy, one of each said pairs of Peltier-type junctions being a P-type junction and the other of said junctions being an N-type junction so that heat is transferred from said heat absorbing shoes to said heat dissipating members when an electric current is passed through said Peltier-type junctions, and means controlled by the temperature of the localized portion of one of said lamps and connected to said source of electrical energy for controlling the amount of heat transfer by said Peltier-type junctions in accordance with the temperature of said localized portions so that the localized portion of each of said lamps is maintained at said predetermined temperature and the light output of said lamps is maintained at optimum.

5. The combination which comprises, radiation-generating means comprising a metallic-vapor discharge device desired to be operated under such conditions as would normally cause the operating metallic-vapor pressure within said device to exceed the pressure desired, and cooling means associated with said generating means and comprising a thermoelectric cooling member acting when energized to cool a selected location within said generating means to reduce the operating metallic-vapor pressure therein so that it at least approaches the pressure desired.

6. The combination which comprises, radiation-generating means comprising a low-pressure mercury-vapor discharge device desired to be operated under such conditions as would normally cause the operating mercury-vapor pressure within said device to exceed the pressure desired, and cooling means associated with said generating means and comprising a thermo-electric cooling member acting when energized to cool a selected location within said generating means to reduce the operating mercury-vapor pressure therein so that it at least approaches the pressure desired.

7. The combination which comprises, radiation-generating means comprising a low-pressure mercury-vapor discharge device desired to be operated under such conditions as would normally cause the operating mercury-vapor pressure within said device to exceed the pressure desired, and D.C. operable cooling means positioned external to said generating means and comprising a thermoelectric cooling member acting when energized to cool a selected portion of said generating means to reduce the operating mercury-vapor pressure therein so that it at least approaches the pressure desired.

8. The combination which comprises, radiation-generating means comprising a low-pressure mercury-vapor discharge device desired to be operated under such conditions as would normally cause the operating mercury-vapor pressure within said device to exceed the pressure desired, and cooling means associated with said generating means and comprising a D.C.-operable thermoelectric cooling member having when energized a hot junction and a cold junction, the hot junction of said cooling means adapted to have generated heat removed therefrom, and the cold junction of said cooling means positioned to cool a selected location within said generating means to reduce the operating mercury-vapor pressure therein so that it at least approaches the pressure desired.

9. The combination which comprises, radiation-generating means comprising a low-pressure mercury-vapor discharge device desired to be operated under such conditions as would normally cause the operating mercury-vapor pressure within said device to exceed the pressure desired, and cooling means associated with said generating means and comprising a D.C-operable thermoelectric cooling member having when energized a hot junction and a cold junction, at least one of the junctions of said thermoelectric member having an enlarged area to improve the thermal transmissive properties thereof, the hot junction of said cooling means adapted to have generated heat removed therefrom, and the cold junction of said cooling means positioned to cool a selected location within said generating means to reduce the operating mercury-vapor pressure therein so that it at least approaches the pressure desired.

10. The combination which comprises, radiation-generating means comprising a low-pressure mercury-vapor discharge device desired to be operated under such conditions as would normally cause the operating mercury vapor pressure within said device to exceed the pressure desired, and cooling means associated with said generating means and comprising a D.C.-operable thermoelectric cooling member having when energized a hot junction and a cold junction, the hot junction of said thermoelectric member having an enlarged area to improve the thermal transmission therefrom, the hot junction of said cooling means adapted to have generated heat removed therefrom, and the cold junction of said cooling means positioned to cool a selected location within said generating means to reduce the operating mercury-vapor pressure therein so that it at least approaches the pressure desired.

11. The combination which comprises, radiation-generating means comprising a low-pressure mercury-vapor discharge device desired to be operated under such conditions as would normally cause the operating mercury-vapor pressure within said device to exceed the pressure desired, and cooling means associated with said generating means and comprising a D.C.-operable thermoelectric cooling member having when energized a hot junction and a cold junction, the cold junction of said thermoelectric member having an enlarged area to improve the thermal transmission thereto, the hot junction of said cooling means adapted to have generated heat removed therefrom, and the cold junction of said cooling means positioned to cool a selected location within said generating means to reduce the operating mercury-vapor pressure therein so that it at least approaches the pressure desired.

12. The radiation-generating combination which includes: a low-pressure mercry-vapor discharge device desired to be operated under such conditions as would normally cause the operating mercury-vapor pressure therein to exceed that pressure desired, said device comprising, a radiation-transmitting phosphor-coated and elongated envelope, lead conductors sealed through each end of said envelope, and electrodes operatively disposed at either end of said envelope and electrically connected to said lead conductors; and a thermoelectric cooling element associated with said device, said thermoelectric element having when energized a hot junction and a cold junction, the hot junction of said thermoelectric element adapted to have generated heat removed therefrom, and the cold junction of said thermoelectric element positioned to cool in predetermined amount a selected location within said device, whereby the operating mercury-vapor pressure within said device at least approaches that pressure desired.

13. The radiation-generating combination which includes: a low-pressure mercury-vapor discharge device desired to be operated under such conditions as would normally cause the operating mercury-vapor pressure therein to exceed that pressure desired, said device comprising, a radiation-transmitting and elongated envelope, lead conductors sealed through each end of said envelope, electrodes operatively disposed at either end of said envelope and supported by said conductors; and a plurality of D.C.-operable thermoelectric elements associated with said device, said thermoelectric elements each having a hot junction and a cold junction, the hot junctions of said thermoelectric elements adapted to have generated heat removed therefrom, and the cold junctions of said thermoelectric elements positioned to cool in predetermined amount selected locations within said discharge device; whereby the operating mercury-vapor pressure within said device at least approaches that pressure desired.

14. The radiation-generating combination which includes: a low-pressure mercury-vapor discharge device desired to be operated under such conditions as would normally cause the operating mecury-vapor pressure therein to exceed that pressure desired, said device comprising a radiation-transmitting and elongated envelope, lead conductors sealed through each end of said envelope, electrodes operatively disposed at either end of said envelope and supported by said lead conductors; and a separately-energizable thermoelectric element associated with said device, said thermoelectric element having when operated a hot junction and a cold junction, the hot junction of said thermoelectric element adapted to have generated heat removed therefrom, and the cold junction of said thermoelectric element positioned to cool in predetermined amount a selected location within said discharge device; whereby the operating mercury-vapor pressure within said device at least approaches that pressure desired.

References Cited by the Examiner

UNITED STATES PATENTS

| | | | |
|---|---|---|---|
| 837,499 | 12/1906 | Perkins | 62—119 |
| 1,897,586 | 2/1933 | Pirani | 313—34 |
| 2,122,285 | 6/1938 | Holst et al. | 313—34 |
| 2,618,738 | 11/1952 | Foulds | 240—47 |
| 2,872,788 | 2/1959 | Lendenblad | 62—3 |
| 2,873,358 | 2/1959 | Dunker | 240—51.11 |
| 2,898,743 | 8/1959 | Bradley | 62—3 |
| 2,902,262 | 9/1959 | Morse | 165—40 |
| 2,924,436 | 2/1960 | Baran | 240—47 |
| 2,932,753 | 4/1960 | Arnott et al. | 313—109 X |
| 2,966,602 | 12/1960 | Waymouth et al. | 313—109 X |
| 3,035,419 | 5/1962 | Wigert | 62—259 X |
| 3,112,890 | 12/1963 | Snelling | 62—119 X |

JAMES W. LAWRENCE, *Primary Examiner.*

GEORGE NINAS, Jr., RALPH G. NILSON, GEORGE N. WESTBY, *Examiners.*

B. A. REITER, C. R. CAMPBELL, *Assistant Examiners.*